US008047712B1

(12) United States Patent
Sturner et al.

(10) Patent No.: US 8,047,712 B1
(45) Date of Patent: Nov. 1, 2011

(54) METHOD AND APPARATUS FOR PREDICTING STEADY STATE TEMPERATURE OF SOLID STATE DEVICES

(75) Inventors: William P. Sturner, Cherry Hill, NJ (US); Ming T. Shih, Bethlehem, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 373 days.

(21) Appl. No.: 11/881,306

(22) Filed: Jul. 26, 2007

(51) Int. Cl.
*G01K 1/12* (2006.01)
*G01K 3/04* (2006.01)
*G01K 3/14* (2006.01)

(52) U.S. Cl. .............. 374/152; 374/102; 374/29; 374/1; 374/5; 702/130; 702/99; 703/2

(58) Field of Classification Search ............. 374/1–2, 374/10–12, 4, 5, 29–39, 43–45, 57, 100, 374/112, 120, 121, 135, 137, 141, 144, 163, 374/170, 179, 18, 3, 152, 115, 134, 124; 702/99, 130–136, 139; 703/2; 716/5, 9, 716/4
See application file for complete search history.

(56) References Cited

U.S. PATENT DOCUMENTS

| | | | | |
|---|---|---|---|---|
| 4,126,033 A * | 11/1978 | Bartoli et al. | .................... | 374/44 |
| 5,080,496 A * | 1/1992 | Keim et al. | .................... | 374/144 |
| 5,401,090 A * | 3/1995 | Muth et al. | .................... | 312/201 |
| 5,604,687 A * | 2/1997 | Hwang et al. | .................... | 703/12 |
| 5,756,878 A * | 5/1998 | Muto et al. | .................... | 73/25.03 |
| 6,331,075 B1 * | 12/2001 | Amer et al. | .................... | 374/44 |
| 6,462,313 B1 * | 10/2002 | Sandhu | ......................... | 219/497 |
| 6,507,007 B2 * | 1/2003 | Van Bilsen | ..................... | 219/497 |
| 6,995,946 B2 * | 2/2006 | Ding et al. | ................. | 360/78.07 |
| 7,058,532 B1 * | 6/2006 | Yamagishi et al. | ........... | 702/100 |
| 7,347,621 B2 * | 3/2008 | Sri-Jayantha et al. | ......... | 374/166 |
| 7,539,587 B2 * | 5/2009 | Frankel et al. | .................. | 702/85 |
| 7,586,064 B1 * | 9/2009 | Smith | ........................... | 219/497 |
| 7,627,841 B2 * | 12/2009 | Shakouri et al. | ................ | 716/136 |
| 7,823,102 B2 * | 10/2010 | Chandra et al. | ................ | 716/136 |
| 2006/0224349 A1 * | 10/2006 | Butterfield | ..................... | 702/130 |
| 2008/0175303 A1 * | 7/2008 | Robbins | ........................ | 374/179 |
| 2009/0240390 A1 * | 9/2009 | Nenadic et al. | .................. | 701/31 |
| 2009/0319965 A1 * | 12/2009 | Kariat et al. | ...................... | 716/4 |

FOREIGN PATENT DOCUMENTS

JP 200614575 A * 4/2006

OTHER PUBLICATIONS

"Cooling Techniques for Electronic Equipment", Chapter 9, pp. 331-341, 2nd Edition, by Dave S. Steinberg, Copyright 1991 by John Wiley and Sone, Inc.

* cited by examiner

Primary Examiner — Gail Verbitsky
(74) Attorney, Agent, or Firm — Howard IP Law Group, PC

(57) ABSTRACT

The disclosure generally relates to method and apparatus for predicting the steady state temperature of solid state devices, preferably under transient conditions. An apparatus according to one embodiment of the disclosure includes a thermocouple for detecting temperature of the solid state system; a processor in communication with the thermocouple and programmed with instructions to: construct an initial curve for the solid state system, the initial curve having a shape; obtain a plurality of theoretical temperature curves for the solid state system; select one of the plurality of theoretical temperature curves having a shape closest to the shape of the initial curve; and superimposing the selected theoretical temperature curve on the initial curve to predict the steady state temperature.

23 Claims, 6 Drawing Sheets

US 8,047,712 B1

METHOD AND APPARATUS FOR PREDICTING STEADY STATE TEMPERATURE OF SOLID STATE DEVICES

BACKGROUND

The amount of energy transmitted by an electronic component into a board on which the component is mounted can affect the board's and the component's performance. The energy generated by the component is a function of the construction material of the component, the material used in the board and the thermoconductivity of the component and the board. Other factors affecting the component or the board's temperature include air velocity and availability of a cooling system. Determining the amount of energy transmitted by a component into its surrounding is complex and time consuming. Such determinations are often necessary for the design of the system and require sophisticated software systems and hours of calculation. Such software typically utilize finite element analysis (FEA).

A typical calculation determines the component's temperature as a function of its construction material and the heat generated when the component is operating continuously at its maximum capacity. Under such conditions, the thermal profile of the component under study is typified by a curve having a rather steep initial slope which gradually approaches an asymptotic point. The temperature remains constant beyond the asymptotic point. Consequently, the asymptotic point can be viewed as the point where the device reaches its steady state temperature. That is, the point at which further rise in temperature and heat loss due to cooling reach an equilibrium.

Depending on the complexities of the component, the conventional models require up to several hours for determining the component's steady state temperature. If the component is operated intermittently or if the component is used at less than its maximum capacity, the conventional systems typically fail to predict a steady state temperature. Using FEA for thermal analysis of such systems can take up to several days if not weeks of calculation. Accordingly, there is a need for a method and apparatus for predicting the steady state temperature of a solid state device during transient operation.

SUMMARY

In one embodiment, the disclosure relates to an apparatus for predicting a steady state temperature of a solid state system, comprising: a thermocouple for detecting temperature of the solid state system; a processor in communication with the thermocouple and programmed with instructions to: construct an initial curve for the solid state system, the initial curve having a shape; obtain a plurality of theoretical temperature curves for the solid state system; select one of the plurality of theoretical temperature curves having a shape closest to the shape of the initial curve; and superimposing the selected theoretical temperature curve on the initial curve to predict the steady state temperature.

In another embodiment, the disclosure relates to a method for predicting a steady state temperature of a solid state system, the method comprising: constructing an initial curve for the solid state system, the initial curve having a shape; obtaining a plurality of theoretical temperature curves; selecting one of the plurality of theoretical temperature curves having a shape closest to the shape of the solid state system; and superimposing the selected theoretical temperature curve on the initial curve to predict the steady state temperature.

BRIEF DESCRIPTION OF THE DRAWINGS

These and other embodiments of the disclosure will be discussed in relation to the following non-limiting and exemplary drawings, in which.

DETAILED DESCRIPTION

Figure 1:
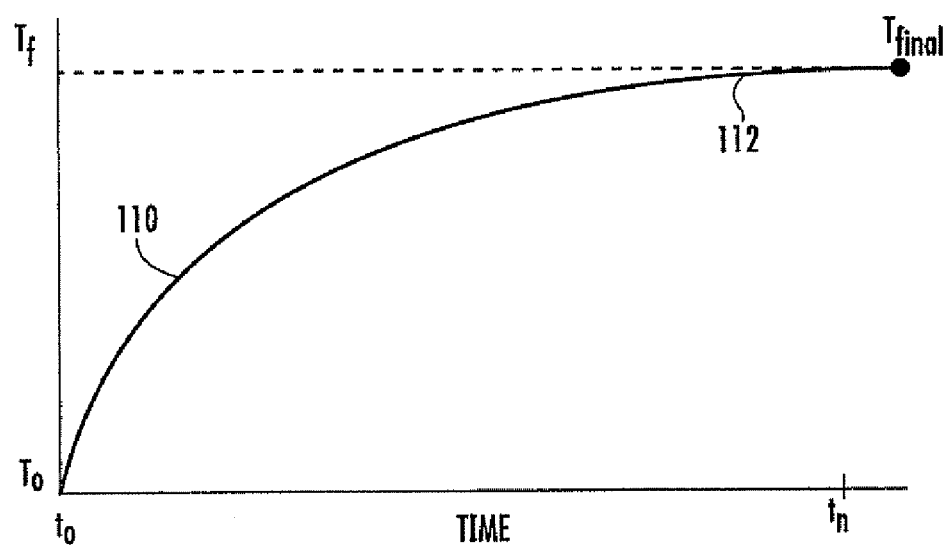
FIG. 1 shows the thermal response of a solid state device during a steady state operating condition.

FIG. 1 shows the thermal response of a solid state device during a steady state operating condition. Specifically, FIG. 1 shows a time dependent non-linear temperature increase for a solid state device during an uninterrupted operating condition. That is, the device under study operates without an interruption or a change of its input power supply or operating conditions. At FIG. 1 the solid state device's temperature is shown at the y-axis and the time is shown at the x-axis. For convenience, temperatures is denoted by "T" and time is denoted by "t" herein. The device under study can be a solid state device such as an electronic module, a circuit board or any other device that comprises solid state components. Moreover, the device under study can comprise a solid state unit such as a microprocessor structured within a larger unit such as a mother board.

Curve 110 of FIG. 1 depicts the device's temperature as a function of time. Curve 110 has a varying slope between temperatures $T_0$ and $T_f$. As the device temperature approaches $T_f$, the curve flattens and curve 110 reaches its asymptote 112. Asymptote 112 occurs at $T_f$ and can be used to predict the steady state temperature of the device.

Figure 2:
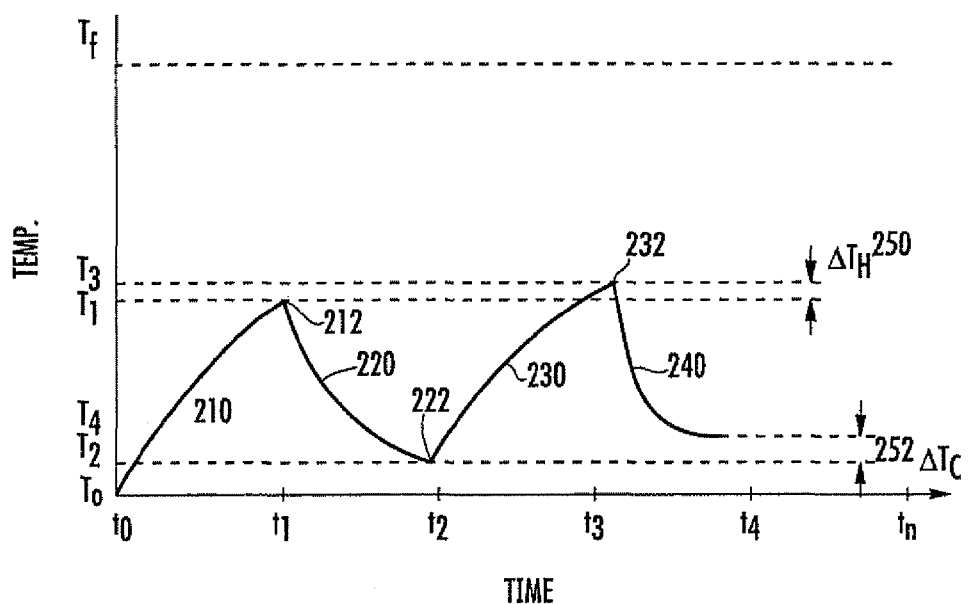
FIG. 2 shows the thermal response of a solid state device during a transient operating condition.

FIG. 2 shows the thermal response of a solid state device during a transient operating condition, e.g., an interrupted or changed operating condition that extends for a brief, finite time period. The transient operating condition can result from a start/stop condition or a change in the input conditions. A change in the input condition can include any change which would affect the device's processing speed or performance thereby causing an increase/decrease in the device's temperature. In FIG. 2, the initial (i.e., at $t_0$) device temperature is $T_0$. Between times $t_0$ and $t_1$, the solid state device is operating and its temperature rises from $T_0$ to $T_1$ as represented by curve 210 which peaks at point 212. At $t_1$ the operating condition of the solid state device is interrupted, for example by cutting off power to the solid state device.

During the power interruption between $t_1$ and $t_2$, the solid state device cools off at a rate represented by curve 220. The heating and cooling processes between $t_0$ and $t_2$ represent one cycle. Cooling curve 220 is interrupted at $t_2$ (corresponding to point 222) where power is once again restored to the solid state device. Between $t_2$ and $t_3$, the device is once again operating and generating heat. However, since the device had not reached the initial temperature $T_0$, the second heating cycle 230 starts at a higher starting temperature $T_2$. The heat generated during time span $t_2$ to $t_3$ is represented by curve 230. Curve 230 is interrupted at $t_3$ (corresponding to point 232) where the solid state device's operation is interrupted. Cool down commences during time span $t_3$ to $t_4$. The solid state device's cooling between $t_3$ and $t_4$ is represented by curve 240. At $t_4$, a second cycle is completed.

In FIG. 2, the temperature increase between the cycles is shown at $\Delta T_H$ 250 which is the temperature increase between the first temperature rise 210 and the second temperature rise 230. Similarly, the system residual cooling system $\Delta T_C$ 252 shows the difference between the lowest points of cooling curves 220 and 240. As shown in FIG. 2, the transient operating conditions i.e., interruptions in this example, make it nearly impossible to estimate the steady state temperature of the solid state device. The conventional modeling systems require many calculations for each heating/cooling cycle. The computation time for estimating the temperature at the end of each heating/cooling cycle can be one time unit. Consequently, the computation time for determining the steady state temperature of the entire system can be n time units, where n represents the number of transient operating cycles. It is clear then that for such systems predicting steady state temperature in a reasonable time can be virtually impossible.

Figure 3:
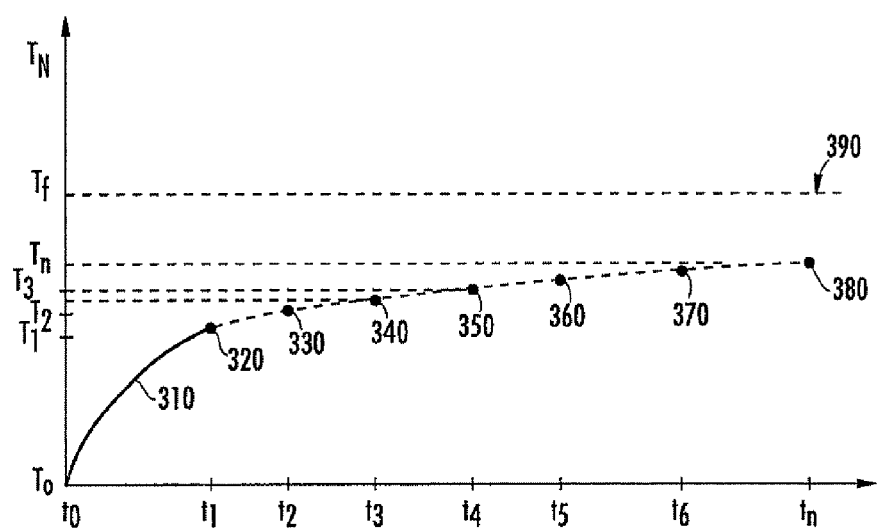
FIG. 3 shows the comparative asymptotes for a solid state device operating in a transient state and a steady state.

FIG. 3 shows the comparative asymptotes for a solid state device operating in an transient and an steady states. In FIG. 3, curve 310 represents the temperature increase for a solid state device. At $t_1$, the solid state device's temperature is $T_1$. Assuming that there is a transient operating cycle e.g., an interruption at $t_1$, the solid state device will cool down before heating up to $T_2$ and beyond. The transient operating cycles (interruptions) are not shown at FIG. 3. Instead, the curve 310 shows the points 320-380, each of which depicts a temperature peak for solid state device at its highest point before an interruption cycle. In other words, curve 310 shows the non-linear temperature growth of the solid state device. Each of temperatures 320-380 can reflect the upper temperature limit of the temperature growth $\Delta T_H$ between sequential interruption operating cycles (see FIG. 2). Once the upper temperature limits are plotted, curve 310 can be used to predict the steady state temperature 380 at the asymptote of curve 310. Comparatively, asymptote 390 represents the steady state temperature of the same solid state device without interruption (steady state operation).

Figure 4:
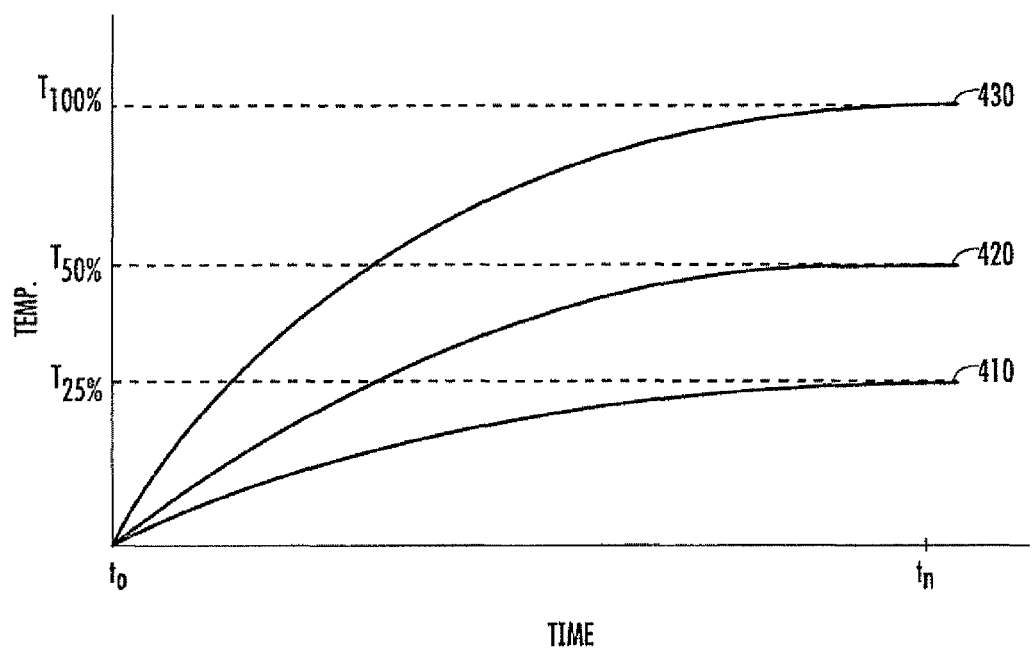
FIG. 4 shows a family of non-linear curves for a solid state device.

FIG. 4 shows a family of non-linear curves for a solid state device. More specifically, FIG. 4 shows an uninterrupted or steady state temperature profile for a solid state device operating under various conditions. For example, curve 410 shows the solid state device's temperature profile where the device is operating at 25% capacity, curve 420 shows the solid state device's temperature profile where the device is operating at 50% capacity and curve 430 shows the solid state device's temperature profile where the device is operating at 100% capacity. The profile representations at the various operating capacities is exemplary and profiles at any operating capacity between 0-100% can be determined without departing from the principles of the disclosure.

Each of curves 410, 420 and 430 reaches a steady state temperature at $T_{25\%}$, $T_{50\%}$ and $T_{100\%}$. Also, each of curves 410, 420 and 430 have a unique shape and an asymptote. The steady state temperature of curves 410, 420 and 430 also denotes the asymptote for each respective curve. Given that each of curves 410, 420 and 430 shows thermal profile of an uninterrupted solid state device, a computer can readily ascertain the steady state temperature based on the curve's asymptote. The computation time for estimating the steady state temperature of each of curves 410, 420 and 430 can be assumed to be one time unit.

According to one embodiment of the disclosure, the steady state temperature of a solid state device which operates with transient operating cycles can be predicted by referencing the device's temperature profile when operating without transient operating cycles. For example, the solid state device profiled at FIG. 3, operates with a transient operating cycle i.e., an interruption, between temperature points 320-380. To predict the device's steady state temperature reference can be made to FIG. 4 where the same device is profiled at various operating capacities. A comparison of the shape of curve 310 (FIG. 3) with one of curves 410, 420 and 430 (FIG. 4) reveals, for example, that curve 310 and curve 410 have a similar shape. The steady state temperature of the device of FIG. 3 can be predicted by superimposing curve 410 onto curve 310. Alternatively, if the shape of curve 310 closely matches the shape of curve 420, the latter can be superimposed on the former to predict the device's steady state temperature.

Figure 5:
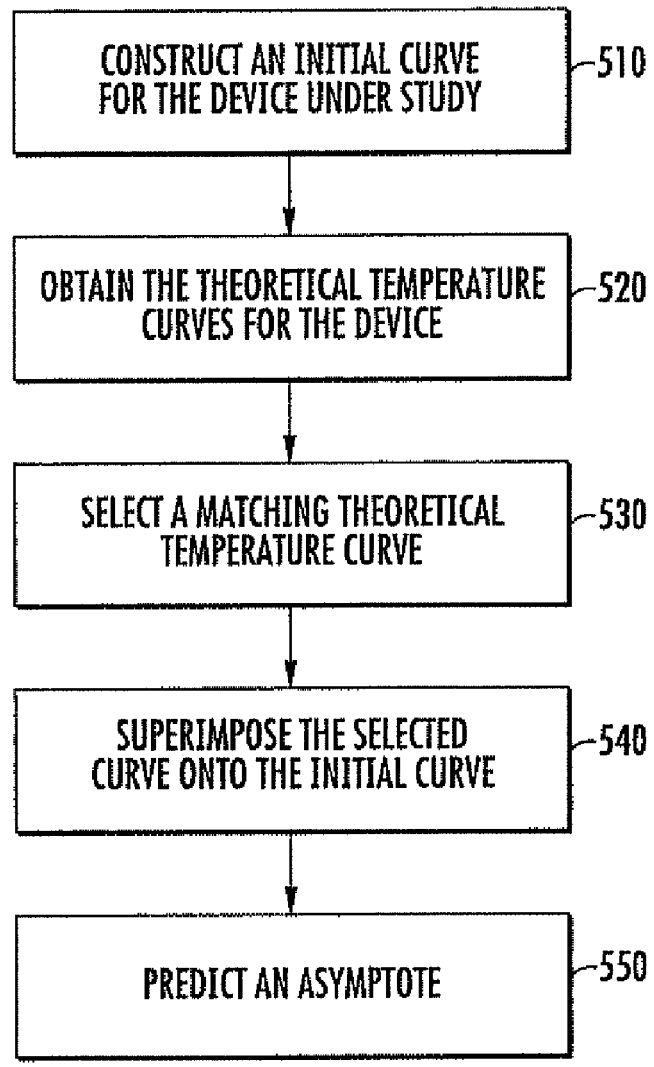
FIG. 5 is an exemplary algorithm according to one embodiment of the disclosure.

FIG. 5 is an exemplary algorithm according to one embodiment of the disclosure. At step 510 an initial curve for the solid state device under study can be constructed. Referring to FIG. 2, the initial curve can be constructed by plotting the temperature at points $T_0$, $T_1$ and $T_3$. A plot of these and similar points can yield an initial curve similar to curve 310 of FIG. 3. Next, the shape of the initial curve can be determined. The shape can be determined, for example, by finding the slope of different lines tangent to the curve at different locations along the curve.

In step 520 a theoretical temperature profile for the solid state device can be constructed. A theoretical temperature profile can provide the solid state device's thermal performance at various uninterrupted operating conditions. In one embodiment, the theoretical temperature profile can show the thermal performance of the solid state device at a range of 0% to 100% operating load. In other embodiments, the temperature profile can provide a thermal profile for the device under uninterrupted (steady state) operating loads of about 25%, 35%, 45%, 55%, 65%, 75%, 85%, 95%, and any other uninterrupted operating load.

In step 530, the shape of the initial curve can be used to identify the theoretical temperature curve with the closest matching shape. Once the closest theoretical temperature curve is identified, the theoretical temperature curve can be superimposed (step 540) or fitted on to the initial curve to construct a final curve having an asymptote. Step 540 may further include adding a constant to provide a temperature shift or other conventional mathematical techniques for proper curve fitting. The asymptote of the final curve provides a basis for predicting the steady state temperature of the solid state device operating with a transient operating condition.

Figure 6:
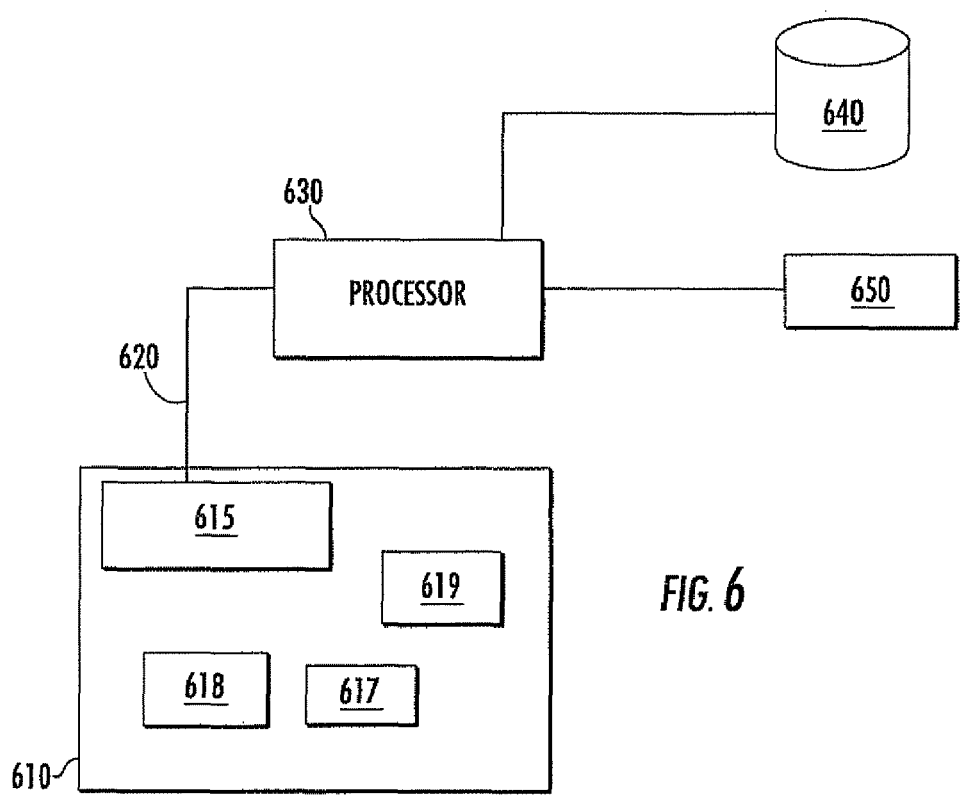
FIG. 6 shows an exemplary apparatus according to one embodiment of the disclosure.

FIG. 6 shows an exemplary apparatus according to one embodiment of the disclosure. In FIG. 6 device 610 can comprise a motherboard with processors 615, 617, 618 and 619. In one embodiment, processor 630 can define the solid state apparatus under study. Thus, thermocouple 620 can communicate the operating temperature of device 615 to processor 630. In an alternative embodiment, thermocouple 620 can communicate the operating temperature of device 610. Using instantaneous temperatures, processor 630 can construct an initial curve for processor 615. Processor 630 can comprise a computing apparatus or a firmware programmed with instructions for implementing the exemplary embodiments disclosed herein. Processor 630 can access database 640 which can include a theoretical temperature profile for a solid state device either identical or similar to processor 615. Using the theoretical temperature profiles, processor 630 can select a theoretical temperature curve closely matching the shape of the initial curve for processor 615. Once identified, the closely-matching theoretical temperature curve can be superimposed on the initial curve to predict an asymptote for the initial curve. The asymptote of the initial curve can be used to predict the steady state temperature of processor 615.

The present disclosure may be embodied in other specific forms without departing from the spirit or essential attributes of the disclosure. Accordingly, reference should be made to the appended claims, rather than the foregoing specification, as indicating the scope of the disclosure. Although the foregoing description is directed to exemplary embodiments of the disclosure, it is noted that other variations and modification will be apparent to those skilled in the art; and may be made without departing from the spirit or scope of the disclosure.

What is claimed is:

1. An apparatus for predicting a steady state temperature of a solid state electronic device, comprising:
a thermocouple for detecting temperature of the solid state electronic device;
a processor in communication with the thermocouple and programmed with instructions for performing an algorithm, the instructions to:
construct an initial curve for the solid state electronic device by detecting a starting temperature for the solid state electronic device and at least three operating temperatures, the initial curve having a shape;
obtain a plurality of theoretical temperature curves for the solid state electronic device;
select one of the plurality of theoretical temperature curves having a shape closest to the shape of the initial curve; and
superimpose the selected theoretical temperature curve on the initial curve to predict the steady state temperature.

2. The apparatus of claim 1, further comprising a memory for storing the plurality of theoretical temperature curves.

3. The apparatus of claim 1, wherein the initial curve defines a thermodynamic response of the solid state electronic device to a transient operating condition.

4. The apparatus of claim 1, wherein the shape of the initial curve includes a curved line portion.

5. The apparatus of claim 1, wherein the initial curve includes a straight line portion.

6. The apparatus of claim 1, wherein each of the theoretical temperature curves includes a curved line portion.

7. The apparatus of claim 1, wherein each of the theoretical temperature curves defines a thermodynamic response of the solid state electronic device to a different operating condition.

8. The apparatus of claim 1, wherein at least one of the plurality of theoretical temperature curves defines a thermodynamic response of the solid state electronic device to a steady state operating condition.

9. The apparatus of claim 1, wherein the selected theoretical temperature comprises an asymptote.

10. The apparatus of claim 9, wherein the asymptote of the selected theoretical temperature curve defines the steady state temperature of the solid state electronic device.

11. The apparatus of claim 1, wherein the solid state electronic device is one of a circuit board or an electronic module.

12. The apparatus of claim 1, wherein the instruction to superimpose the selected theoretical temperature curve on the initial curve further comprises curve fitting the selected theoretical temperature curve on the initial curve.

13. A method for predicting a steady state temperature of a solid state electronic device, the method comprising:
constructing an initial curve for the solid state electronic device by detecting a starting temperature for the solid state electronic device and at least three operating temperatures, the initial curve having a shape;
obtaining a plurality of theoretical temperature curves;
selecting one of the plurality of theoretical temperature curves having a shape closest to the shape of initial curve of the solid state electronic device; and
superimposing the selected theoretical temperature curve on the initial curve to predict the steady state temperature.

14. The method of claim 13, wherein the initial curve defines a thermodynamic response of the solid state electronic device to a transient operating condition.

15. The method of claim 13, wherein the shape of the initial curve includes a curved line portion.

16. The method of claim 13, wherein the initial curve includes a straight line portion.

17. The method of claim 13, wherein each of the theoretical temperature curves includes a curved line portion.

18. The method of claim 13, wherein each of the theoretical temperature curves defines a thermodynamic response of the solid state electronic device to a different operating condition.

19. The method of claim 13, wherein at least one of the plurality of theoretical temperature curves defines a thermodynamic response of the solid state electronic device to a steady state operating condition.

20. The method of claim 13, wherein the selected theoretical temperature comprises an asymptote.

21. The method of claim 20, wherein the asymptote of the selected theoretical temperature curve defines the steady state temperature of the solid state electronic device.

22. The method of claim 13, wherein the solid state electronic device is one of a circuit board or an electronic module.

23. The method of claim 13, wherein the step of superimposing the selected theoretical temperature curve on the initial curve further comprises curve fitting the selected theoretical temperature curve on the initial curve.

* * * * *